Patented Oct. 18, 1932

1,883,215

UNITED STATES PATENT OFFICE

WILLIAM COURTNEY WILSON, OF CHICAGO, ILLINOIS, ASSIGNOR, BY DIRECT AND MESNE ASSIGNMENTS, TO CELLOVIS, INC., OF CHICAGO, ILLINOIS, A CORPORATION OF DELAWARE

LOW VISCOSITY NITROCELLULOSE AND PROCESS OF MAKING THE SAME

No Drawing.   Application filed July 1, 1926. Serial No. 119,995.

This invention relates to the manufacture of nitrocellulose having certain desirable properties especially useful in the art of nitrocellulose lacquer manufacture. Furthermore, the utilization of relatively cheap altered cellulosic materials of high uniformity in place of unaltered natural materials heretofore used, enables those skilled in the art to so predetermine the nitrating conditions as to produce a nitrocellulose of a preferred viscosity when in solution especially suited for use in lacquers, leather dopes, and the like.

The present invention has for its object the production of a nitrocellulose that will give solutions of a relatively low viscosity when dissolved in any of the well known solvents therefor without the necessity of especially treating the nitrocellulose in order to render it capable of giving less viscous solutions.

It has long been known that when cellulose is treated with certain mixtures of nitric acid and sulphuric acid, that a chemical reaction takes place resulting in the formation of cellulose nitrate, commonly known as nitrocellulose. Certain types of this nitrocellulose, known also as pyroxylin, are soluble in such solvents as esters, including ethyl acetate, butyl propionate, ethyl lactate, and the like, and ketones such as acetone, as well as many other organic solvents such as nitrobenzol, furfural, and mixtures of alcohol and ether. Such solutions have been used for many purposes, among which has been the preparation of lacquers or protective coatings.

Until recently, the lacquers containing nitrocellulose have been almost exclusively confined to application upon metals where the evaporation of the solvents leaves a very thin film deposited upon the surface of the metal. These lacquers have not been satisfactory for many purposes because it was necessary to apply a very great number of coats in order to obtain a protective coating of sufficient thickness to be satisfactory. This was because when a sufficient amount of nitrocellulose was used in the lacquer to leave a film of sufficient thickness after evaporation of the solvents, the solution was too viscous to be applied in any of the ordinary manners such as with a paint brush or spray gun. It is obvious, therefore, that methods or processes leading to a fundamental modification of the nitrocellulose so as to render it capable of being dissolved in much larger quantity in a given amount of solvent, without the solution becoming unworkably viscous, would be valuable. Solutions of nitrocellulose containing sufficient of the material to give a satisfactorily thick film are then sufficiently nonviscous to be easily applied. Incidentally, if twice or three times the amount of nitrocellulose is contained in the same quantity of solvent, it follows that, to produce a given thickness of film the solvent lost by evaporation is reduced by one half or two thirds.

Recently, workable solutions containing relatively large amounts of modified nitrocellulose have been prepared. This has been accomplished by a special treatment of the nitrocellulose to obtain a product of lower viscosity. In my joint Patent No. 1,397,915, November 22, 1921, to Bacon and Wilson, there is described a process which will bring about such a change in the nitrocellulose as to render it capable of giving solutions of relatively low viscosity.

My present invention eliminates this second step which is expensive, hazardous, and increases the difficulty of production control where a product of high uniformity is desired.

My present application has for its object the production of nitrocellulose of relatively low viscosity when in solution, by the practice of a one step process whereby a preferred material such as an altered cellulose is nitrated by so predetermining and regulating the conditions of nitration as to produce a nitrocellulose of the low viscosity type. For example, bleached paper pulp, produced by either the well known sulphite or soda process, corn cob cellulose from furfural manufacture, and other forms of bleached cellulose, most of which contain relatively large amounts of such modified forms of cellulose as hydrocellulose and oxycellulose, are useful for my purpose as raw materials of the altered cellulose type. There is considerable latitude in the choice of altered cellulose materials since substantially any altered cellulose material is suitable for my purpose if properly predetermined low viscosity nitrocellulose can be produced therefrom by my one step method. Relatively unchanged cellulose, such as cleaned cotton fibers, which at present constitutes the chief source of raw material for the production of nitrocellulose or pyroxylin suitable for use in lacquers, cannot be used in my process unless it is first chemically altered so that there is formed during the process of alteration relatively large amounts of hydrocellulose and oxycellulose. Because of the cheapness and uniformity, however, I prefer to use such types of cellulosic materials as bleached wood pulp produced either by the well known sulphite or soda process, or corn cob cellulose from furfural manufacture, as these are relatively high in these constituents. I am not certain that it is the presence of oxycellulose and hydrocellulose that makes such altered forms of cellulose suitable for my purpose, but I do know that cellulose which has been so treated as to form during the treatment appreciable amounts of oxycellulose and hydrocellulose becomes suitable for my purpose. Therefore a choice of raw material is essential to the process. It is my belief that a process of treating cellulose in which oxy- or hydro-cellulose is formed, produces an accompanying altered form of cellulose which is the essential base material for this invention, and that if this material could be isolated or otherwise produced free from the oxy- or hydro-cellulose equally good, and probably better results would be obtained.

The pulp itself, however, if used in the form of tissue paper is relatively too expensive when compared to the cost of cleaned cotton linters. On the other hand, cellulose pulp as it is ordinarily sold under the names pulp lap or lap board consists of boards or sheets that are too thick and heavy to nitrate uniformly throughout. In order to obtain rapid, thorough and uniform nitration, it is necessary that the cellulose material be in such a state that all of the fibers are readily accessible to the nitrating acid. However, the commercial forms of a material such as soda pulp are only about one third the cost of cleaned cotton linters. It is therefore most economical to use soda pulp in its commercial form and disintegrate the same into a fine fluffy condition in a suitable machine in order to obtain the condition most desirable for rapid, thorough and uniform nitration. This results in a commercial cellulose especially well adapted as a raw material for my purpose, and produces a product of high uniformity and of greatly reduced cost.

The step of utilizing a cellulose that has been properly comminuted to put it in a suitable form for thorough and uniform nitration, making possible the use of cheap raw materials for the production of a high grade product, likewise the treatment of scrap paper, vulcanized fiber and similar cellulose materials for the production of either a high or low viscosity type of nitrocellulose, forms the subject of a co-pending application Serial No. 184,435, filed April 16, 1927.

The choice of raw materials alone, however, is not sufficient to produce a low viscosity type of nitrocellulose, because only certain nitrating conditions will produce an end product of this type. As the materials of my choice of each kind produce products of a high degree of uniformity, during successive nitrations, it is possible to predetermine the exact nitrating conditions, that is, the acid composition, temperature and length of time for nitration that will give products producing low viscosity nitrocellulose. This has not been possible heretofore, hence the two step method has been practiced of converting a nitrocellulose of relatively high viscosity to one of low viscosity by a second step as previously described, which is already well known in the art.

Of course it is not possible to so regulate the method of operation with such a high degree of precision of nitration that a blending operation can be dispensed with where a high degree of uniformity is essential, and therefore a blending operation, such as is ordinarily used in the manufacture of nitrocellulose is usually desirable.

The nitrocellulose produced by my process is especially and directly suited for use in lacquers, since it dissolves extremely rapidly in the well known nitrocellulose solvents, and solutions may be prepared containing from 4 to 10% or more of nitrocellulose which have a viscosity sufficiently low to permit spraying with the well known spraying equipment at the ordinary air pressures used in such work.

Nitrocellulose prepared by the herein described method is dissolved in the ordinary solvents more rapidly than cellulose prepared from cotton linters, especially where a properly comminuted type of altered cellulose is used as a raw material. Such nitrocellulose may be precipitated from such solutions by the addition of large amounts of non-solvents such as petroleum ether. Films prepared from such solutions are clean and substantially colorless, and have great mechanical strength. When in a proper condition, as for example when in solution or rendered plastic by one or more suitable plasticizers, the nitrocellulose prepared by my process may be readily incorporated with various modifying agents such as pigments, fillers, dyes, stabilizers, etc., such as are used, for example, in the preparation of lacquers, enamels, leather dopes and the like.

It will be readily seen from the following examples that solutions made from nitrocellulose prepared by my process have a very much lower viscosity than when made from the unmodified nitrocellulose such as nitrocellulose prepared from cleaned cotton linters. A comparison of the actual figures shows that whereas the apparent viscosity of a 5% solution in butyl acetate of unmodified nitrocellulose made from cleaned cotton linters was 1103 centipoises at 25° C., nitrocellulose prepared by the applicant's process gave 5% solutions in butyl acetate having apparent viscosities of 15.25 centipoises (as in Example I), 19.5 centipoises (as in Example II), and 66.12 centipoises (as in Example III).

Example I

One part by weight of substantially dry altered cellulose as for example bleached soda pulp properly comminuted to a fluffy condition is treated with 40 parts by weight of a nitrating mixture consisting of 23½% of nitric acid as $HNO_3$, 58% of sulphuric acid as $H_2SO_4$ and 18½% of water for 30 minutes at 60° C. The acid is then removed from the nitrocellulose by any convenient method as for example by a centrifugal wringer, or by the well known water displacement method. The nitrocellulose is then washed with water and stabilized by any stabilizing process such as those already well known in the art.

There is, of course, some variation in the viscosity of solutions of nitrocellulose prepared from different types of soda pulps. The apparent viscosity of a 5% solution in butyl acetate of nitrocellulose prepared in the above described manner from one type of bleached soda pulp was 15.25 centipoises at 25° C.

Example II

One part by weight of substantially dry altered cellulose as for example bleached sulphite pulp properly comminuted to a fluffy condition is treated with 40 parts of mixed acid consisting of 59% sulphuric acid as $H_2SO_4$, 25% nitric acid as $HNO_3$ and 16% of water for 45 minutes at 55° C. The acid is then removed from the nitrocellulose, and the nitrocellulose stabilized by any proper method, as for example by repeated washing with hot and cold water, in which may be used acids such as sulphuric and salts or bases such as sodium carbonate.

A 10 gram sample of nitrocellulose prepared as described in this example from one type of bleached sulphite pulp when dissolved in 190 grams of butyl acetate, gave a solution having an apparent viscosity of 19.5 centipoises at 25° C.

Example III

That form of cellulose known as "cellucotton" is a suitably altered chemical wood pulp for the purpose of this invention. This material is a spruce fiber which has been subjected to a soft cook (long time) by the acid sulphite process such as a Mitscherlick spruce pulp, and then bleached in the usual way with a calcium oxychloride bleach. One part of this cellucotton is nitrated with 35 parts by weight of a mixed acid consisting of 59.2% sulphuric acid as $H_2SO_4$, 23.2% of nitric acid as $HNO_3$ and 17.6% of water for 40 minutes at 60° C. The nitrocellulose is then separated from the acid and stabilized as described in the previous examples. The apparent viscosity of a 5% solution in butyl acetate of nitrocellulose so prepared was 66.12 centipoises at 25° C.

The examples are given by way of illustration, and it should be understood that wide variations are possible in choice of materials used, proportions of reagents, and time and temperature of operation. Furthermore, it should be understood that combinations of altered cellulose can be made where certain average viscosities are required, or that mixtures of the nitrated products can likewise be made. It should also be understood that altered cellulose in such forms as scrap paper, vulcanized fiber, and the like, may be used in place of the wood pulp provided it is properly cleaned of refuse, ink, size, etc., in such a manner that the nitrocellulose product therefrom does not contain extraneous matter.

Wherein I have used the term altered cellulose in the specifications and claims, it is to be understood as not only including cellulose materials containing bleached pulp as obtained by the well known soda or sulphite processes, such as that obtained from wood, straw, cotton rags or other cellulose containing bodies such as corn cobs, scrap paper and the like, but any cellulosic material that by predetermined conditions such as disintegration and conditions of nitration will give a nitrocellulose of the low viscosity type by my one step process.

Wherein I have used the term, nitrocellulose of the low viscosity type, I mean thereby a nitrocellulose which when dissolved in the proportion of 5 parts by weight of nitrocellulose to 95 parts of butyl acetate, such solution will have an apparent viscosity not to exceed 150 centipoises when measured at 25° C.

Wherein I have used the term, nitrocellulose of high viscosity type, I mean thereby a nitrocellulose, which when dissolved in the proportions of 5 parts by weight of nitrocellulose to 95 parts of butyl acetate, such solution will have an apparent viscosity greater than 150 centipoises when measured at 25° C.

By the term, workable solution, I mean a nitrocellulose free from objectionable extraneous material dissolved in a suitable solvent therefor, such solution being capable of being used in such manner and in such processes in which a low viscosity type of nitrocellulose is useful.

Wherein I have used the term, nitrocellulose lacquer, I mean those types of protective coatings containing nitrocellulose as an ingredient therein.

What I claim is:

1. A reaction product of that form of cellulose which has the essential properties of chemically altered cellulose accompanying the formation of oxy- and hydrocellulose and a nitrating acid bath having the essential properties of a nitrating acid containing not less than 16% by weight of water and not more than 59.2% by weight of sulfuric acid comprising a cellulose nitrate of the low viscosity type.

2. A reaction product of a chemically treated cellulose and a nitrating acid bath having the essential properties of a nitrating acid containing not less than 16% by weight of water and not more than 59.2% by weight of sulfuric acid comprising a cellulose nitrate of the low viscosity type.

3. A reaction product of a sulfite pulp and a nitrating acid mixture having the essential properties of a nitrating acid containing not less than 16% by weight of water and not more than 59.2% by weight of sulfuric acid comprising a cellulose nitrate of the low viscosity type.

4. A reaction product of a finely comminuted bleached wood pulp cellulose and a nitrating acid mixture having the essential properties of a nitrating acid containing not less than 16% by weight of water and not more than 59.2% by weight of sulfuric acid comprising a cellulose nitrate of the low viscosity type.

5. The herein described process comprising nitrating that form of cellulose which has the essential properties of altered cellulose accompanying the formation of oxy- and hydrocellulose with a nitrating acid having the essential properties of a nitrating acid mixture containing not less than 16% by weight of water and not more than 59.2% by weight of sulfuric acid whereby a cellulose nitrate of low viscosity type is produced in a one step operation.

6. The herein described process comprising nitrating a chemically altered cellulose which has the esential properties of the modified cellulose accompanying the formation of oxy- and hydrocellulose with a nitrating acid mixture containing not less than 16% by weight of water and not more than 59.2% by weight of sulfuric acid whereby a cellulose nitrate of low viscosity type is produced in a one step operation.

7. The herein described process comprising nitrating a chemical wood pulp cellulose which has the essential properties of altered cellulose accompanying the formation of oxy- and hydrocellulose with a nitrating acid mixture containing not less than 16% by weight of water and not more than 59.2% by weight of sulfuric acid whereby a cellulose nitrate of low viscosity type is produced in a one step operation.

8. The herein described process comprising nitrating a finely divided fluffy mass of cellulose pulp which has the essential properties of chemically altered cellulose accompanying the formation of oxy- and hydrocellulose with a nitrating acid mixture containing not less than 16% by weight of water and not more than 59.2% by weight of sulfuric acid whereby a cellulose nitrate of low viscosity type is produced in a one step operation.

9. The herein described process comprising nitrating a finely divided disintegrated fluffy mass of wood pulp cellulose having the essential properties of altered cellulose accompanying the formation of oxy- and hydrocellulose with a nitrating acid mixture containing not less than 16% by weight of water and not more than 59.2% by weight of sulfuric acid whereby a cellulose nitrate of low viscosity type is produced in a one step operation.

10. The herein described process comprising nitrating that form of cellulose which has the essential properties of a bleached sulfite pulp with a nitrating acid mixture containing not less than 16% by weight of water and not more than 59.2% by weight of sulfuric acid whereby a cellulose nitrate of low viscosity type is produced in a one step operation.

11. The herein described process comprising nitrating that form of cellulose which has the essential properties of altered cellulose accompanying the formation of oxy- and hydrocellulose with a nitrating acid mixture having the essential properties of a nitrating acid containing from 23.2% to 25% nitric acid and 58 to 59.2% sulfuric acid whereby a low viscosity type of cellulose nitrate is produced in a one step operation.

12. A step in the process of producing a low viscosity type of nitrocellulose comprising the mechanical comminuting of a cellulose pulp into finely divided fibrous particles and nitrating the same to produce a nitrocellulose of low viscosity type.

13. The herein described process comprising nitrating, in a finely divided condition, a bleached wood pulp cellulose with a nitrating acid mixture having the essential properties of a nitrating acid containing from 23.2% to 25% nitric acid and 58 to 59.2% sulfuric acid whereby a low viscosity type of cellulose nitrate is produced in a one step operation.

14. A nitrocellulose compound comprising the nitration product of a nitrating acid and a chemically altered cellulose, said product having initially the property of forming with 19 parts of butyl acetate a solution having a viscosity not greater than 150 centipoises at 25° C. when one part thereof is dissolved.

15. A one step process of producing low viscosity nitrocellulose which comprises nitrating a mechanically disintegrated fluffy mass of chemical wood pulp cellulose.

16. The method of making a nitrocellulose solution from wood which comprises treating wood chemically to isolate cellulose by a process which forms therein oxycellulose and hydrocellulose, nitrating said cellulose to produce a low viscosity type of nitrocellulose in a one step operation, removing acid from and stabilizing the product of nitration, and dissolving a quantity of the nitrocellulose and modifying agents in a solvent therefor which forms a workable solution with such quantity and said modifying agents.

17. A nitrocellulose compound comprising the nitration product of a nitrating acid bath and a chemically altered cellulose, said product having initially the property, when mixed one part with nineteen parts of butyl acetate, of forming a solution having a viscosity not greater than 200 centipoises at 25 degrees C.

18. The process of forming a low viscosity type of nitrocellulose which comprises nitrating chemically altered cellulose by immersion in a nitrating acid bath having not less than 16% of water to produce initially a product one part of which, when dissolved in nineteen parts of butyl acetate, has at 25 degrees C. a viscosity of not over 200 centipoises.

19. The process of forming a low viscosity type of nitrocellulose which comprises nitrating chemically altered cellulose by immersion in a nitrating acid bath having not less than 16% of water to produce initially a product one part of which, when dissolved in nineteen parts of butyl acetate, has at 25 degrees C. a viscosity of not over 150 centipoises.

Signed at Chicago in the county of Cook and State of Illinois this nineteenth day of June, A. D. 1926.

WILLIAM COURTNEY WILSON.